L. MORRIS.
ANIMAL TRAP OR DIP.
APPLICATION FILED MAR. 6, 1909.
976,678.
Patented Nov. 22, 1910.
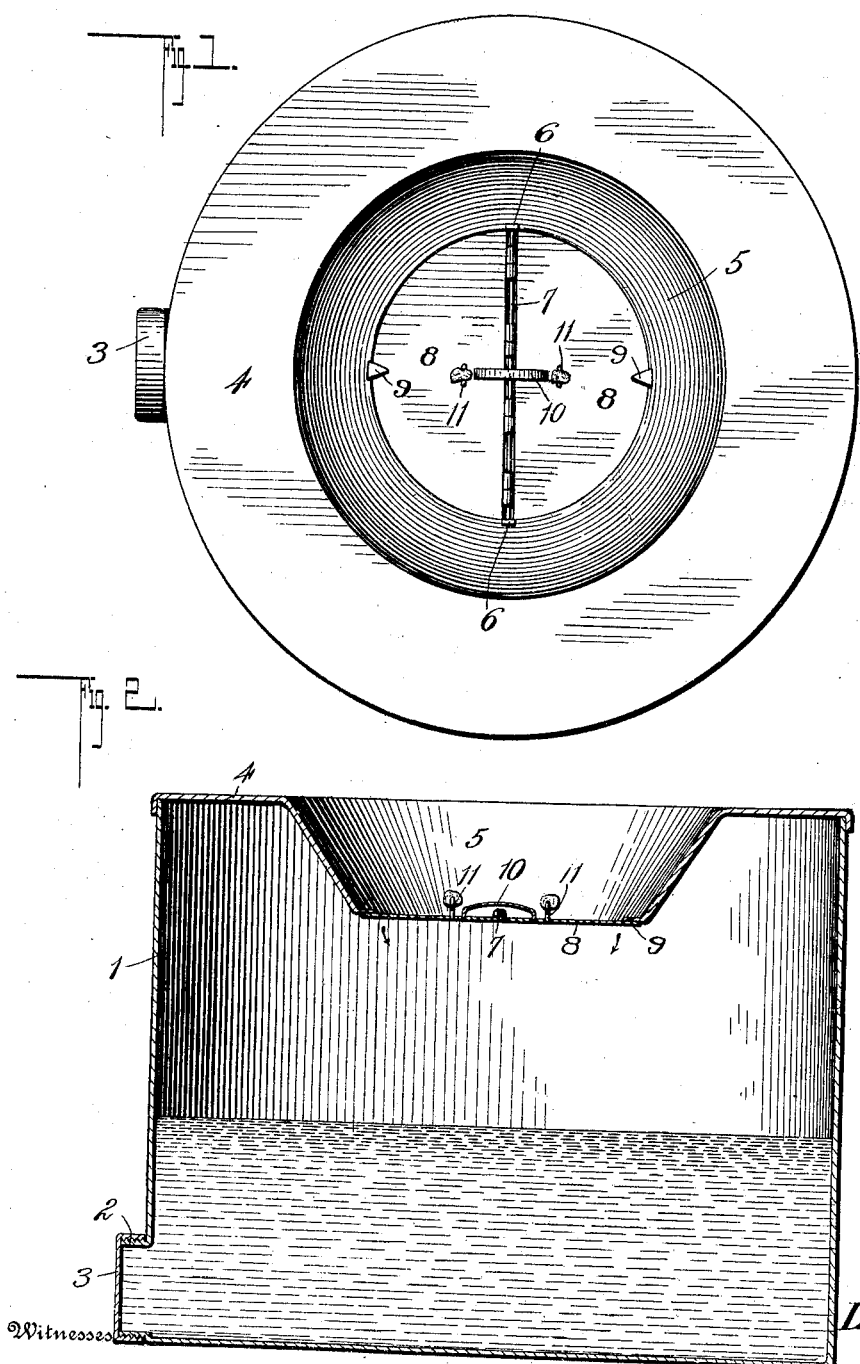

ably equal to the length of the body

UNITED STATES PATENT OFFICE.

LEOPOLD MORRIS, OF VICTORIA, TEXAS.

ANIMAL TRAP OR DIP.

976,678. Specification of Letters Patent. Patented Nov. 22, 1910.

Application filed March 6, 1909. Serial No. 481,723.

*To all whom it may concern:*

Be it known that I, LEOPOLD MORRIS, a citizen of the United States, residing at Victoria, in the county of Victoria and State of Texas, have invented a new and useful Improvement in Animal Traps or Dips, of which the following is a specification.

This invention relates to a trap designed to catch and hold either alive or immersed in a suitable liquid various small animals, such as mice, rats and various small game animals.

The trap can be made in different sizes, according to the nature of the animal to be trapped, and if desired can be sunk into the ground, or in a table or other suitable platform.

The invention consists in the novel features of construction hereinafter described, pointed out in the claim and shown in the accompanying drawings, in which:

Figure 1 is a plan view of the trap. Fig. 2 is a vertical section of the same.

In constructing this trap, I preferably form it of metal, although it may be constructed of wood and lined with tin, and the trap is preferably cylindrical in form.

In the drawings 1 represents the receptacle which is adapted to contain a suitable liquid if it is desired to kill the animals trapped, and adjacent the bottom, the receptacle is provided with a threaded neck 2 upon which is screwed a cap 3. By unscrewing the cap, the contents of the receptacle can be discharged, or if the animals are trapped alive, they can be released through the opening formed by the neck 2. The receptacle is provided with a top 4, the central portion of which is cut out and the marginal portion of said center is inclined downwardly and inwardly as shown at 5, and in order to make the operation of the trap certain, I prefer to have the inclined portion 5 and the flat portion of the top 4 of a width substantially equal to the body length of the animal to be trapped. Upon opposite sides of the incline 5 and at the lower edge of the same are arranged ears 6 in which is journaled a rod 7 to which is hinged semi-circular inwardly opening wings or covers 8. The incline 5 also carries inwardly projecting tongues 9 which prevent upward opening of the covers 8. These covers are connected by a spring 10, sensitive enough to permit the weight of the animal upon the cover to force it down, but strong enough to at once lift the cover into closed position as soon as it is relieved of the weight of the animal. The inclined portion 5 will prevent the animal trapped from escaping when the cover swings inwardly under the weight of a second animal. Suitable hooks or other bait holding means 11 are carried by the covers upon which the desired form of bait can be placed.

The construction of the incline 5 is considered of importance as without it the operation of the device would be uncertain, and there would be a possibility of an animal already trapped escaping when the cover was opened by weight of the second animal. At the same time if the inclined portion is too long or too steep animals of suspicious natures and especially rats will avoid the trap, as the rat will not jump from the top 4 upon an unknown or untried surface, such as the covers 8, and it is therefore considered essential that the width of the inclined portion should be as previously stated about equal to the length of the body of the animal to be trapped, and that the degree of inclination should be sufficient to prevent escape of trapped animals, but at the same time gentle enough to coax the animal to descend it to one of the covers.

I am aware of the fact that traps have been designed with hinged wings or covers upon which an animal was supposed to jump and then be deposited in a closed receptacle. These traps have not been practically a success as very often the particular animal sought to be trapped was too wary to jump upon a strange surface.

Where it is not designed to kill any of the animals caught the cover 4 can be applied to a reticulated receptacle as well as to one adapted to hold a liquid.

What I claim is:—

The combination with an animal retaining receptacle, of a cover having a central opening, said cover having a flat outer marginal portion, and a downwardly and inwardly inclined inner marginal portion, the said portions being substantially equal in width to the body length of the animal to be trapped, a diametrically arranged rod bridging the central opening, covers hinged to said rod, a spring connecting said covers, and means for preventing the covers swinging upwardly above a horizontal plane.

LEOPOLD MORRIS.

Witnesses:
L. N. HOFER,
H. D. WHITEMAN.